US010661602B2

(12) United States Patent
Friske et al.

(10) Patent No.: US 10,661,602 B2
(45) Date of Patent: May 26, 2020

(54) REINFORCED COMPOSITE HYBRID WHEEL CONSTRUCTION

(71) Applicant: Ford Global Technologies, LLC, Dearborn, MI (US)

(72) Inventors: David Douglas Friske, Wolverine Lake, MI (US); John Jeffrey Pfeiffer, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 15/725,958

(22) Filed: Oct. 5, 2017

(65) Prior Publication Data

US 2019/0105943 A1 Apr. 11, 2019

(51) Int. Cl.
| | |
|---|---|
| *B60B 7/14* | (2006.01) |
| *B60B 7/06* | (2006.01) |
| *B60B 7/04* | (2006.01) |
| *B60B 5/02* | (2006.01) |
| *B60B 7/01* | (2006.01) |
| *B60B 1/08* | (2006.01) |
| *B60B 5/00* | (2006.01) |

(52) U.S. Cl.
CPC ............... *B60B 7/14* (2013.01); *B60B 5/02* (2013.01); *B60B 7/01* (2013.01); *B60B 7/04* (2013.01); *B60B 7/061* (2013.01); *B60B 7/065* (2013.01); *B60B 1/08* (2013.01); *B60B 5/00* (2013.01); *B60B 2310/305* (2013.01); *B60B 2360/3416* (2013.01); *B60B 2900/111* (2013.01); *B60B 2900/311* (2013.01); *B60B 2900/711* (2013.01)

(58) Field of Classification Search
CPC .. B60B 7/14; B60B 7/01; B60B 7/061; B60B 1/08; B60B 2900/711; B60B 2360/3416; B60B 5/00
USPC ..................................................... 301/37.106
See application file for complete search history.

(56) References Cited

U.S. PATENT DOCUMENTS

| 4,620,616 A | 11/1986 | Martin |
| 4,989,657 A | 2/1991 | Lipper |
| (Continued) | | |

FOREIGN PATENT DOCUMENTS

| CN | 103974834 A | 8/2014 |
| WO | 2013083443 A1 | 6/2016 |
| WO | 2016097628 A1 | 6/2016 |

*Primary Examiner* — S. Joseph Morano
*Assistant Examiner* — Jean W Charleston

(57) ABSTRACT

A method and system for improving the strength, functionality and wear-resistance of a composite hybrid wheel is disclosed. Each spoke may define an airfoil shape and have a secondary wing-like extension attached thereto to generate airflow past the vehicle brakes during vehicle operation. Alternatively, the spokes may be shaped in cross-section as either an I-beam or an H-beam configuration. Customer-interchangeable wheel inserts formed from a reinforced polymerized material, such as a long carbon fiber reinforced composite, are strategically attached to one or more of the spokes. The inserts are used to enhance the aesthetic appeal of the wheel, increase its structural integrity and provide easy interchangeability in the event of damage. A faux bead composite lock ring also formed of a reinforced polymerized material such as a long carbon fiber reinforced composite can be attached to the wheel spokes to cover the composite rim flange.

19 Claims, 9 Drawing Sheets

(56) References Cited

U.S. PATENT DOCUMENTS

| | | | | |
|---|---|---|---|---|
| 6,805,413 | B2* | 10/2004 | Fitzgerald | B60B 3/10 |
| | | | | 301/37.101 |
| 7,681,958 | B1* | 3/2010 | Bagdasarian | B60B 1/14 |
| | | | | 301/67 |
| 8,201,894 | B2* | 6/2012 | Chinavare | B60B 7/10 |
| | | | | 301/37.106 |
| 8,382,211 | B2* | 2/2013 | Renius | B60B 7/065 |
| | | | | 301/37.102 |
| 9,415,628 | B2* | 8/2016 | Kia | B60B 1/14 |
| 2009/0236902 | A1* | 9/2009 | Zibkoff | B60B 1/003 |
| | | | | 301/104 |
| 2010/0314932 | A1 | 12/2010 | Fukaya et al. | |
| 2013/0026815 | A1* | 1/2013 | Smart | B60B 21/025 |
| | | | | 301/58 |
| 2014/0346845 | A1* | 11/2014 | Renner | B60B 3/004 |
| | | | | 301/37.42 |
| 2015/0061354 | A1* | 3/2015 | Tanaka | B60B 3/005 |
| | | | | 301/64.101 |
| 2016/0325582 | A1* | 11/2016 | Werner | B60B 3/041 |

* cited by examiner

REINFORCED COMPOSITE HYBRID WHEEL CONSTRUCTION

TECHNICAL FIELD

The disclosed inventive concept relates to hybrid vehicle wheels having cast or forged metal centers and with rims composed of a composite material. More particularly, the disclosed inventive concept relates to reinforced hybrid vehicle wheels having spokes of I-beam or H-beam configurations in cross-section. The spokes may alternatively or additionally have airfoil-shapes with secondary wing-like extensions attached thereto to improve cooling airflow to the vehicle's brakes. One or more wheel inserts or segments, including elongated or ring-shaped inserts formed from long fiber composite materials.

BACKGROUND OF THE INVENTION

Wheel construction has shown a very wide range of development since the earliest days of vehicle production. Beginning with wooden spokes based on carriage wheels and then on to spokes made of metal, for decades vehicle wheels had been produced from stamped steel. This type of wheel proved both reliable and cost-effective.

However, as both wheel appearance and overall vehicle weight reduction became more important in vehicle design, the ubiquitous stamped steel wheel has generally been replaced by wheels cast from a material such as aluminum, at least in the passenger vehicle sector. Cast aluminum wheels can be formed into many designs and generally provide reduced weight while providing structural integrity.

For all of their benefits, cast aluminum wheels do present challenges to both manufacturers and designers. This is because cast aluminum wheels are required to balance strength, stiffness and part mass. On the one hand, wheel forging can improve the material properties (strength) and reduce mass. However, wheel stiffness may be sacrificed in the process. Wheel geometry can be used to improve these properties but casting and subsequent machining of the wheel limit the usefulness of geometry. For example, it is difficult to make hollow wheel spokes or to create functional shapes that provide aerodynamic benefits.

The design and production of aluminum wheels are not the only challenges faced by wheel designers and manufacturers. Customer satisfaction with regard to today's cast aluminum wheel is generally high but dissatisfaction has been expressed over such wheels having poor scratch resistance. This is particularly frustrating given the considerable expense faced by the consumer in the initial purchase of the cast aluminum wheel. Over time cast aluminum wheels show damage from contact with curbs, road debris and gravel roads. In response, some wheel manufacturers as well as after-market auto parts suppliers offered a spray-on clear coat to resist such damage. However, such clear coat arrangements for wheels have proven to only resist minimal damage before scratching.

In view of the state of the art, it may be advantageous to provide a wheel having both reduced weight and increased scratch resistance without compromising aesthetic qualities. As in so many areas of automobile manufacturing technology, there is always room for improvement in both the design and production of vehicle wheels.

SUMMARY OF THE INVENTION

The disclosed inventive concepts overcome the known problems involved in both designing and manufacturing cast aluminum wheels. Particularly, the disclosed inventive concepts provide a wheel that demonstrates reduced overall weight compared with known cast wheels while adding strength, operating efficiency and design versatility while also improving wear- and damage-resistance.

The vehicle wheel according to the disclosed inventive concept is a two-piece wheel that has a forged wheel center section (or center disc) and a carbon fiber composite rim that is attached to the cast or forged wheel center section. This combination allows the designer and manufacturer increased design versatility while lowering overall wheel weight when compared with known cast aluminum wheels. This construction also allows designers increased flexibility in spoke design to maximize several beneficial attributes of the wheel while creating new wheel functionality.

One of the beneficial design features is a spoke having an airfoil shape defining a wing and a secondary wing-like extension attached to the spoke. The wing and wing-like extension operate to generate airflow past the vehicle brakes during vehicle operation due to rotation of the wheel. Particularly, the air comes from the rear of the spoke and the wing shape is turned into the airflow. The air then moves from the rear of the spoke to the front. The secondary wing-like attachment sits above the airfoil-shaped spoke at an angle which is designed to help the airfoil-shaped spoke increase the air velocity from the rear to the front. Such a configuration has particular utility in racing vehicles that require maximum brake cooling.

Another beneficial design feature of the disclosed inventive concept relates to the construction of the spoke itself which may be shaped in cross-section as either an I-beam or an H-beam configuration. This design maximizes lateral stiffness and may include hollow sections to reduce weight while also allowing the designer to add a distinctive style.

A further beneficial design feature of the disclosed inventive concept is the provision of interchangeable wheel inserts formed from a reinforced polymerized material, such as a long carbon fiber reinforced composite designed to resist abrasion. One or more of the wheel inserts can be easily replaced by the consumer if damaged or if an alternative color or design is desired. The inserts may be attached by any number of arrangements, including through the use of mechanical fasteners such as screws or a nut and bolt arrangement, thereby allowing ease of replacement. The inserts may not only be used to enhance the aesthetic appeal of the wheel, but would also enhance the structural integrity of the wheel while reducing manufacturing cost. For example, a common cast or forged aluminum wheel could provide the basis for many variants for both heavy and light vehicles with the same wheel being rendered unique by the selection and placement of one or more inserts. The shape of the insert can be modified so as to reduce drag, add down force, and supplement brake system cooling through the use of the above-mentioned wing-like extensions. Such a configuration has particular utility in off-road vehicles in which wheels are often subjected to surface damage.

A variation of the wheel insert is the provision of a faux bead composite lock ring preferably composed of the same reinforced polymerized material (a long carbon fiber reinforced composite) as the inserts, thereby providing abrasion resistance. The bead lock ring is attached to the wheel spokes and covers the composite rim flange, thereby protecting the composite rim from damage. Such a configuration also has particular utility in off-road vehicles in which wheels are often subjected to surface damage.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
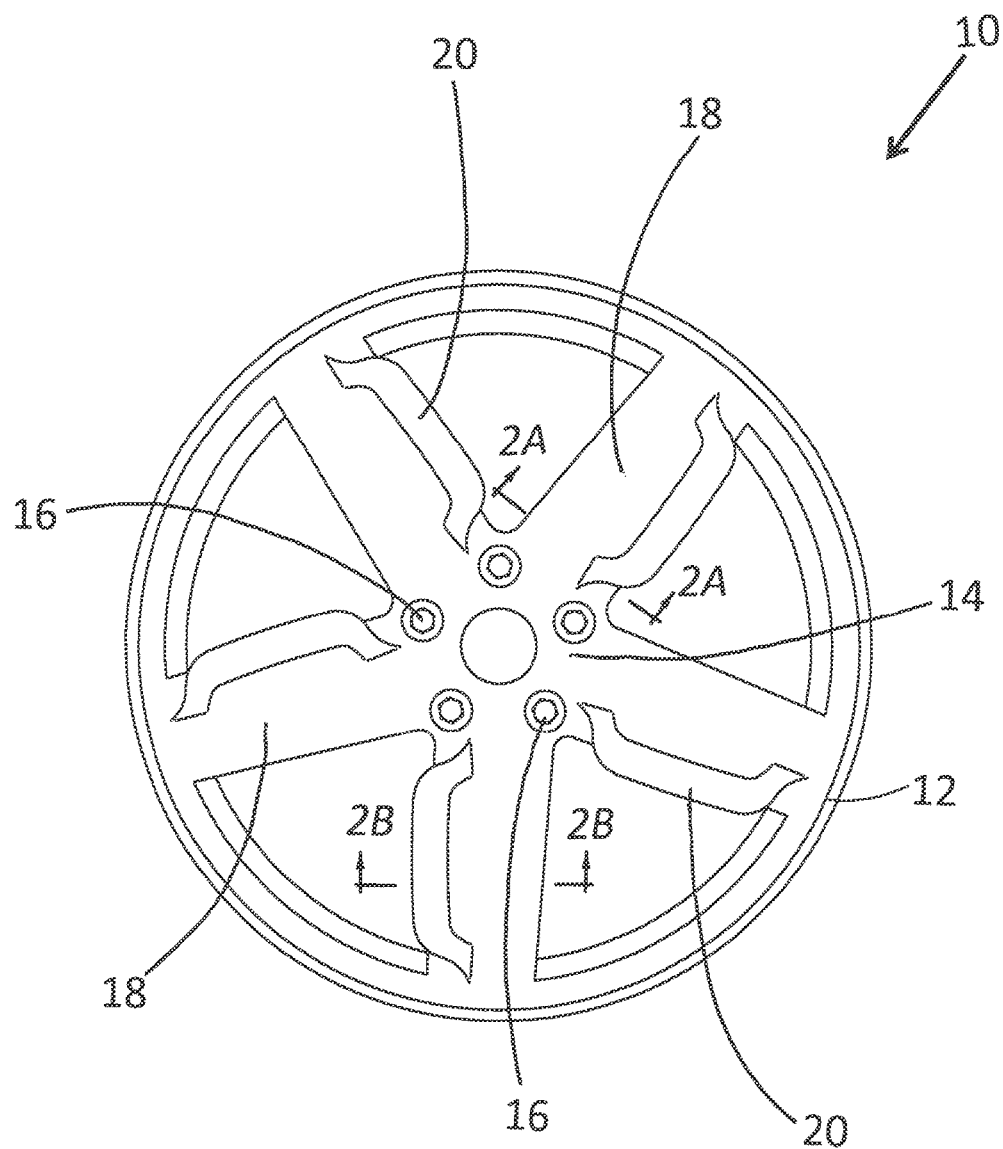
FIG. 1 is a front view of a reinforced composite hybrid wheel according to an embodiment of the disclosed inventive concept having airflow-generating wings or wing-like extensions.

In the following figures, the same reference numerals will be used to refer to the same components. In the following description, various operating parameters and components are described for different constructed embodiments. These specific parameters and components are included as examples and are not meant to be limiting.

Figure 2A:
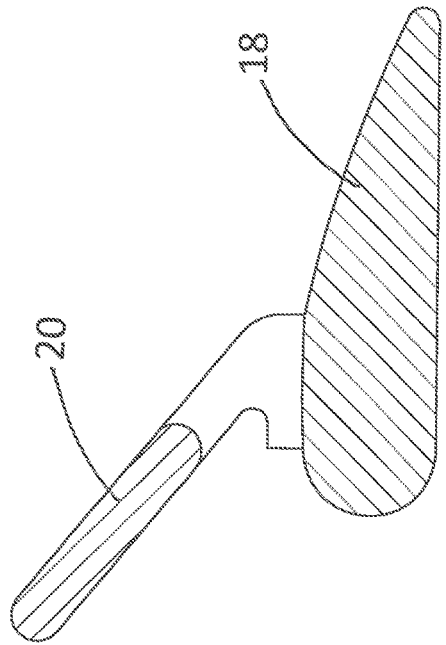
FIG. 2A is a sectional view of a spoke of the embodiment of the reinforced composite hybrid wheel of FIG. 1 taken along line 2A-2A of FIG. 1.
Figure 2B:
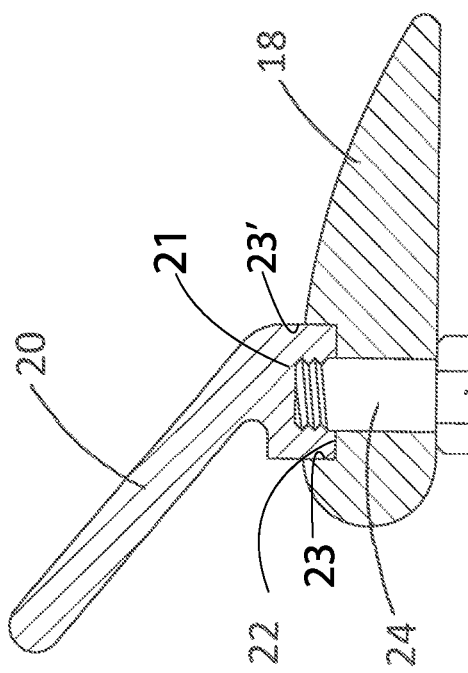
FIG. 2B is a sectional view of a spoke of the embodiment of the reinforced hybrid wheel of FIG. 1 taken along line 2B-2B of FIG. 1.
Figure 4:
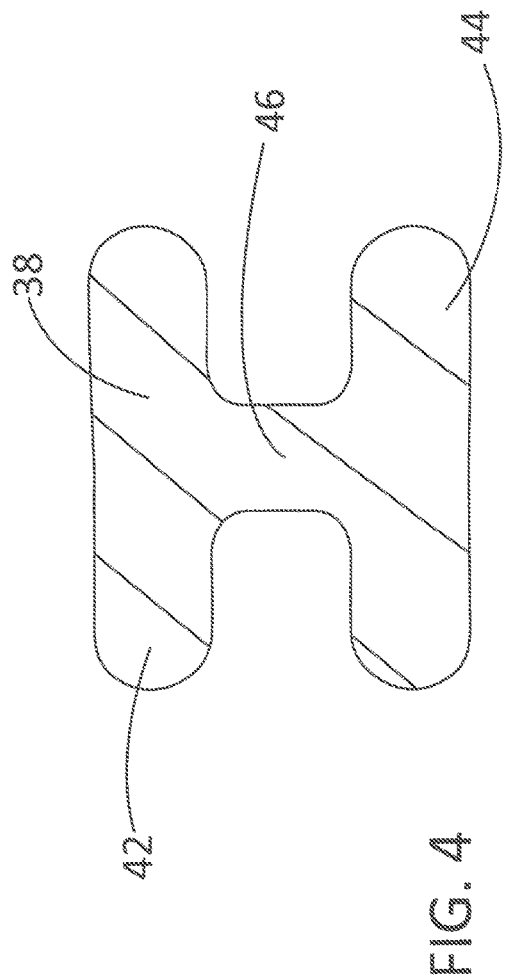
FIG. 4 is a sectional view of a spoke of the embodiment of the reinforced composite hybrid wheel of FIG. 3 taken along line 4-4 of FIG. 3 illustrating the H-beam configuration of the spoke.
Figure 3:
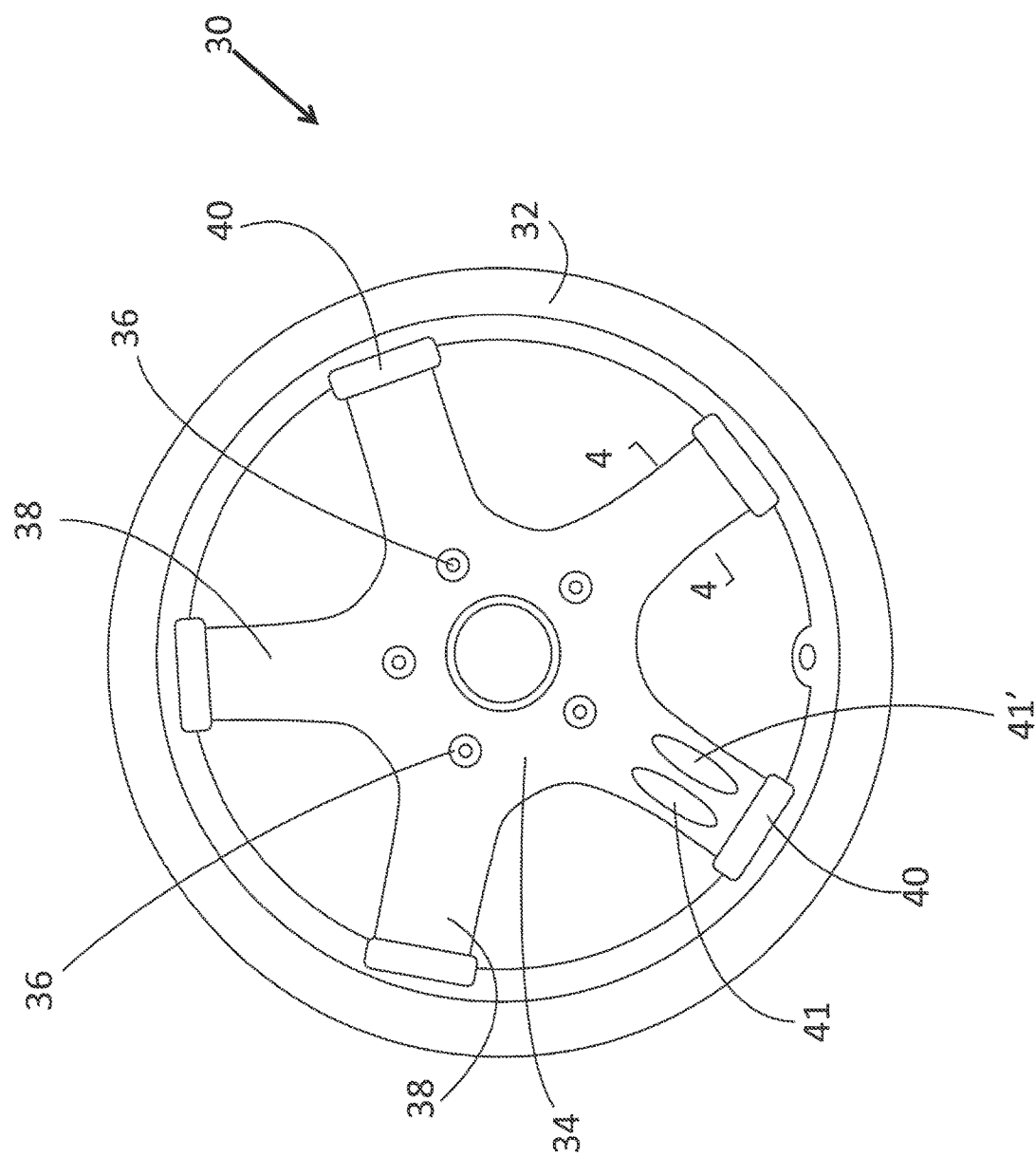
FIG. 3 is a front view of a reinforced composite hybrid wheel according to another embodiment of the disclosed inventive concept in which the spokes have an H-beam configuration in cross-section.
Figure 8:
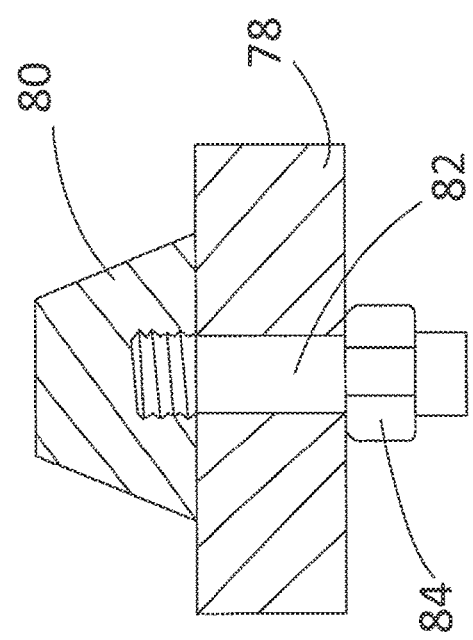
FIG. 8 is a sectional view of a spoke of the embodiment of the reinforced composite hybrid wheel of FIG. 7 taken along line 8-8 of FIG. 7 illustrating the elongated composite insert and spoke assembly.
Figure 7:
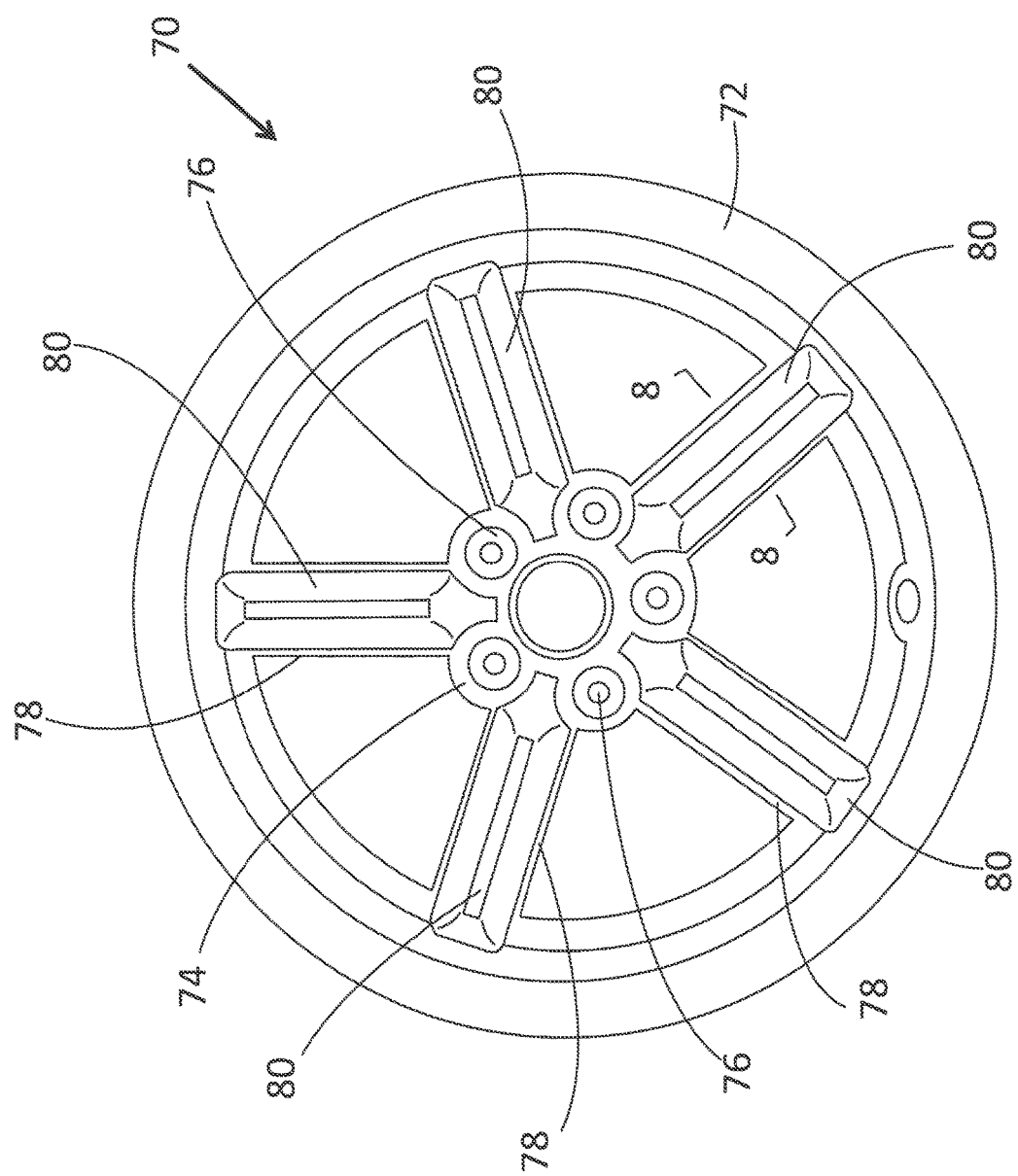
FIG. 7 is a front view of a reinforced composite hybrid wheel according to a further embodiment of the disclosed inventive concept in which elongated composite inserts are attached to the spokes.
Figure 9:
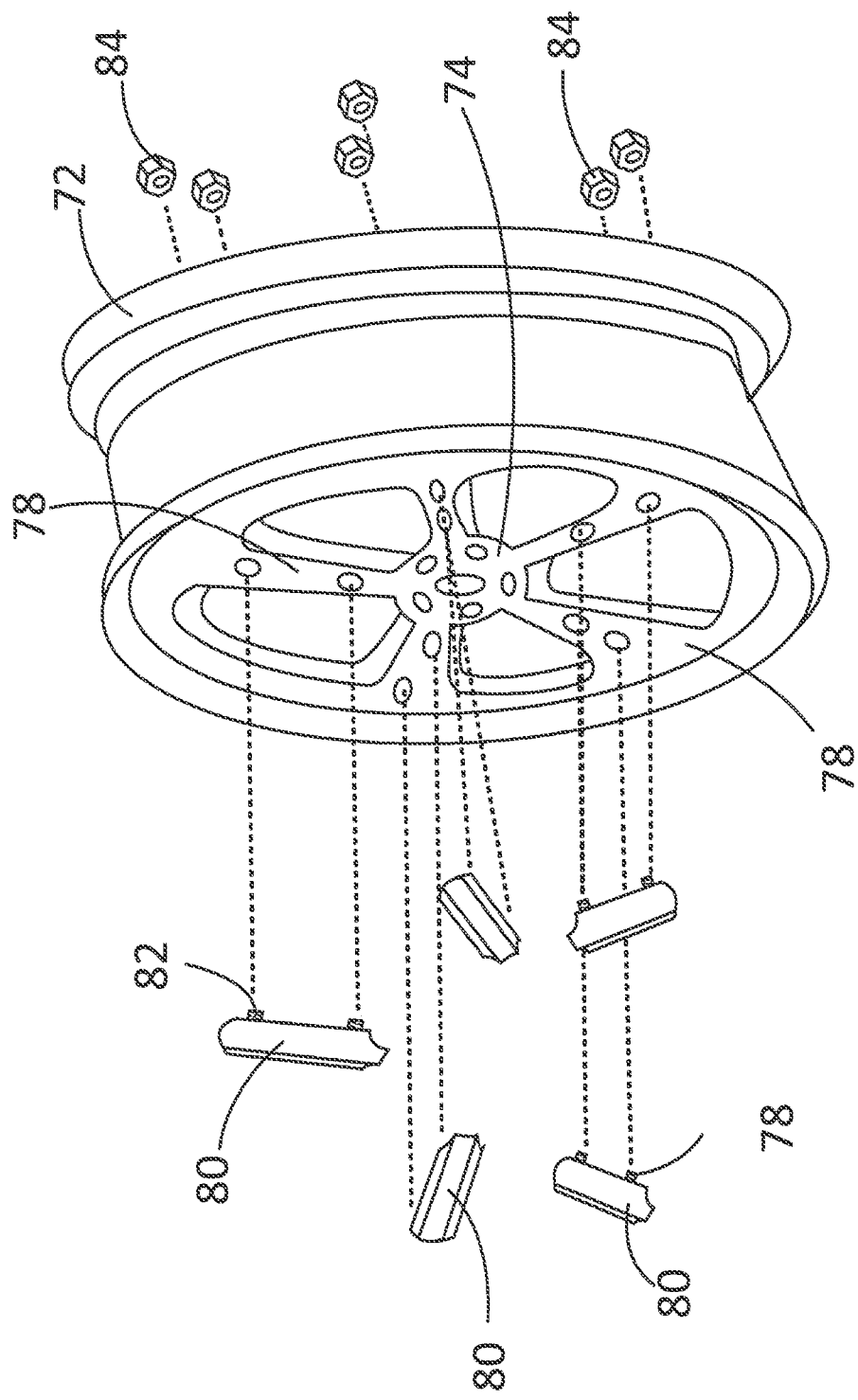
FIG. 9 is a perspective view of the reinforced composite hybrid wheel of FIG. 7 showing the elongated inserts spaced apart from the spokes of the wheel.
Figure 10:
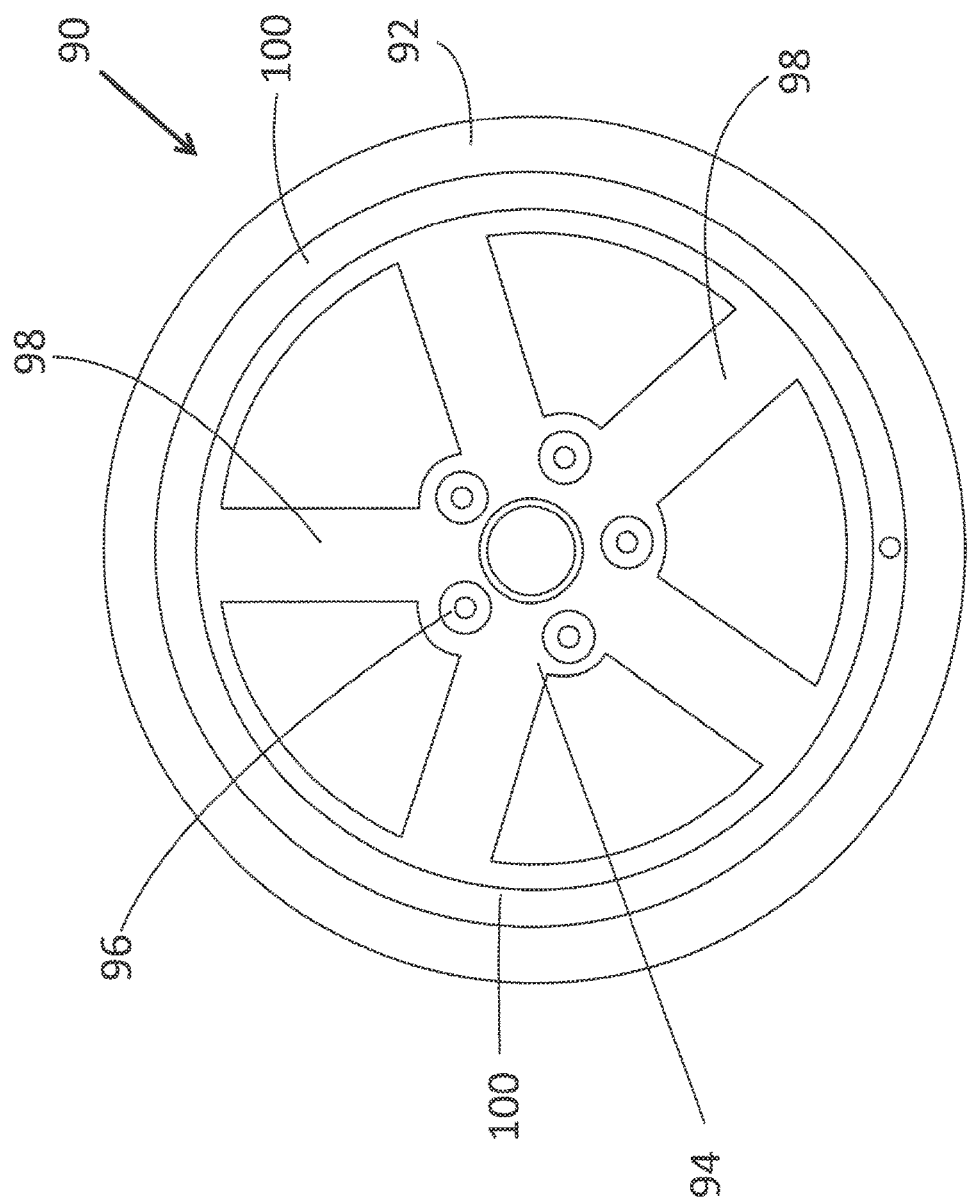
FIG. 10 is a front view of a reinforced composite hybrid wheel according to an additional embodiment of the disclosed inventive concept in which a faux bead composite lock ring is attached to the rim.
Figure 11:
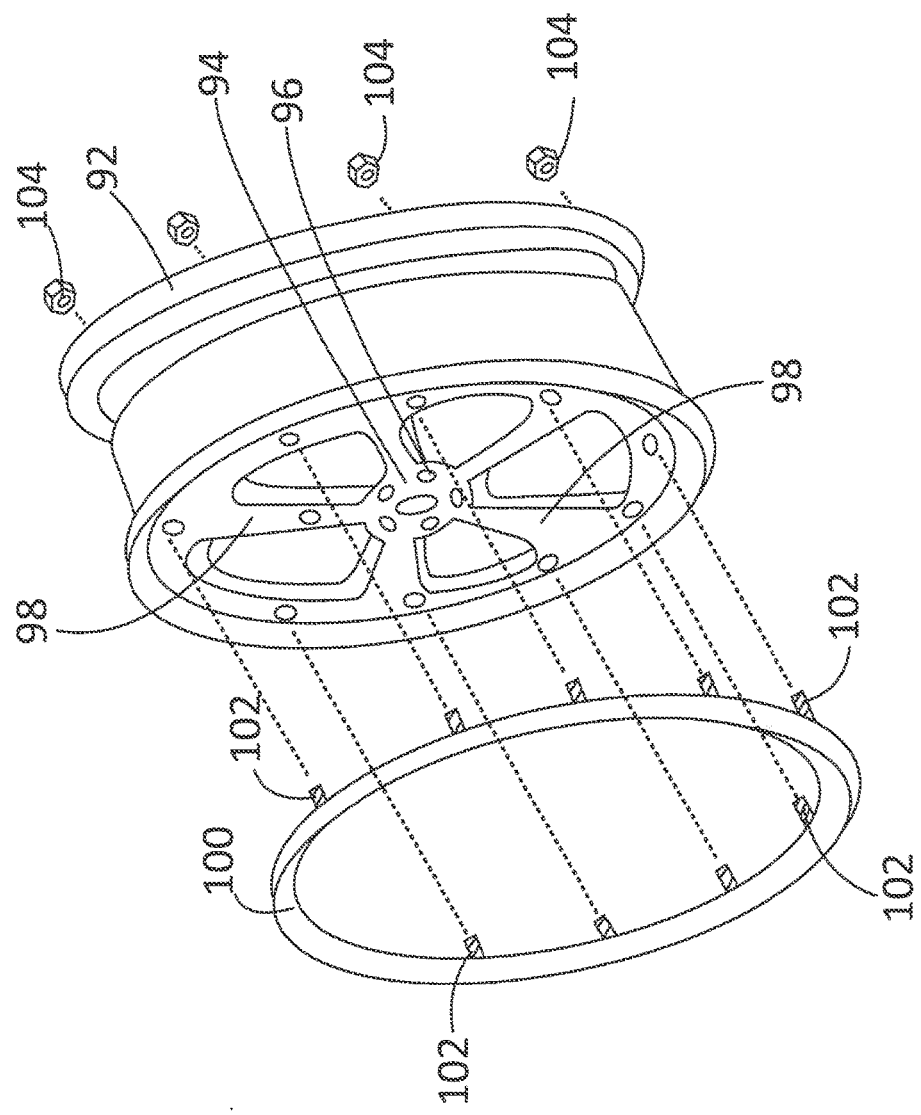
FIG. 11 is a perspective view of the reinforced composite hybrid wheel of FIG. 10 showing the composite ring spaced apart from the spokes of the wheel.

The accompanying figures and the associated description illustrate the construction alternatives proposed in the disclosed inventive concept of a reinforced composite hybrid wheel that includes various insert attachments and design configurations. In general, FIGS. 1, 2A and 2B relate to a composite hybrid wheel construction that includes airflow-generating wings or wing-like extensions. FIGS. 3 and 4 relate to a composite hybrid wheel construction having a H-beam configuration while FIG. 5 and relate to a composite hybrid wheel construction having a I-beam configuration. Interchangeable inserts for attachment to the wheel spokes are shown in FIGS. 7 through 9 while an interchangeable faux bead lock ring for attachment to the composite rim flange is illustrated in FIGS. 10 and 11. It is to be understood that the shapes and sizes of the wheel, the spokes, the wings, the inserts and the ring are suggestive and not intended to be limiting.

Referring to FIG. 1, a front view of an embodiment of the reinforced composite hybrid wheel of the disclosed inventive concept is illustrated and is generally shown as 10. The reinforced composite hybrid wheel 10 includes a composite rim 12 composed of a composite material that preferably includes a reinforcing carbon fiber. The composite rim 12 is attached to a cast or forged wheel center section 14 that is preferably aluminum although other materials could be used in the construction of the center section 14 as is known in the art.

Formed in the cast or forged wheel center section 14 is a plurality of lug holes 16 which may have the same pattern as illustrated or which may have an alternative pattern. Extending outward from the center section 14 is a plurality of spokes 18. A greater or lesser number of spokes 18 may be provided depending on wheel application and design preference.

According to the embodiment of the wheel illustrated in FIG. 1, an airflow-generating, secondary wing-like extension 20 is included in one or more of the spokes 18. Each of the spokes 18 preferably has an airfoil shape, as illustrated in FIGS. 2A and 2B. The secondary wing-like extensions 20 works in conjunction with the airfoil-shaped spoke to direct cooling air to the brake rotor and other components of the brake assembly during regular vehicle operation. The shape, number and placement of the secondary wing-like extensions 20 with respect to the spokes 18 as illustrated is only suggestive as other shapes, numbers and placements may be possible without deviating from the disclosed inventive concept.

The secondary wing-like extensions 20 are preferably but not absolutely formed separate from the cast or forged wheel center section 14 and are attached to by any of several methods. One method is illustrated in FIG. 2A in which the secondary wing-like extension 20 including a base 21 is shown attached to the spoke 18. The spoke 18 includes a recess 22 having a pair of opposed parallel side walls 23 and 23'. The base 21 of the secondary wing-like extension 20 is attached to the recess 22 by mechanical fastening using a screw or a stud 24 and a nut fastener 25. Alternative methods of attachment, including welding or adhesive, are possible.

Referring to FIG. 3, a front view of an additional embodiment of the reinforced composite hybrid wheel of the disclosed inventive concept is illustrated and is generally shown as 30. The reinforced composite hybrid wheel 30 includes a composite rim 32 composed of a composite material that preferably includes a reinforcing carbon fiber. The composite rim 32 is attached to a cast or forged wheel center section 34 that is preferably aluminum although other materials could be used in the construction of the center section 34 as is known in the art.

Formed in the cast or forged wheel center section 34 is a plurality of lug holes 36 which may have the same pattern as illustrated or which may have an alternative pattern. Extending outward from the center section 34 is a plurality of spokes 38. A greater or lesser number of spokes 38 may be provided depending on wheel application and design preference.

A spoke-to-rim attachment 40 is provided between each spoke 38 and the composite rim 32. The spoke-to-rim attachment 40 may be any of several designs that incorporate mechanical fasteners, an adhesive or both. Holes or hollow sections such as holes 41 and 41' may be formed in one or more of the spokes 38 to reduce weight, add distinctive styling or both. The placement and configuration of the holes 41 and 41' as illustrated in FIG. 3 are suggestive only.

The spokes 38 of the reinforced composite hybrid wheel 30 have an H-beam configuration to maximize lateral stiffness. This construction is illustrated in FIG. 4 in which a sectional view of the spoke 38 of the reinforced composite hybrid wheel 30 is illustrated. As shown in that figure, the H-beam configuration is formed by an outer rib 42, an inner rib 44 and a connecting rib 46. One or more additional ribs may be provided.

Figure 5:
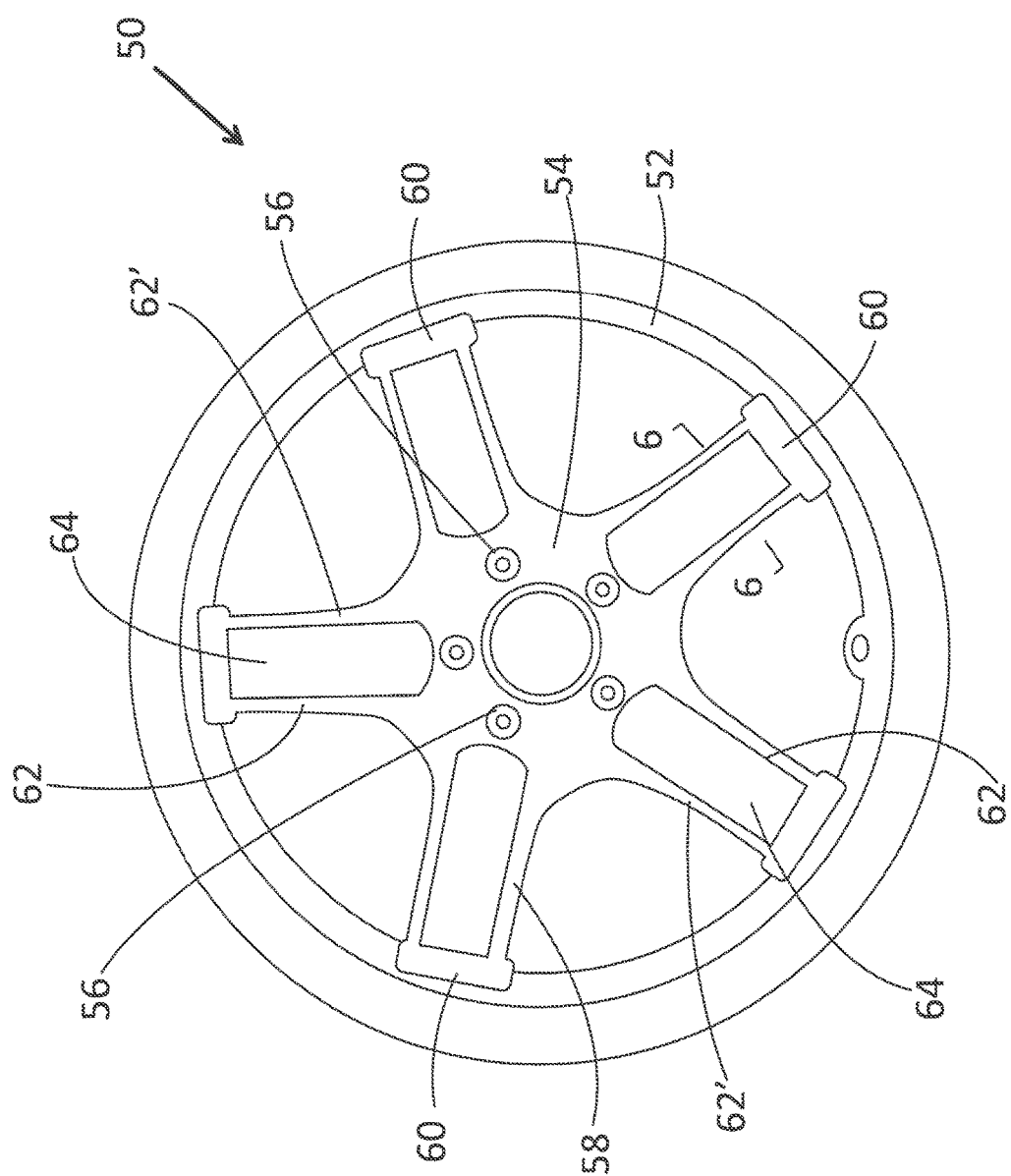
FIG. 5 is a front view of a reinforced composite hybrid wheel according to another embodiment of the disclosed inventive concept in which the spokes have an I-beam configuration in cross-section.
Figure 6:
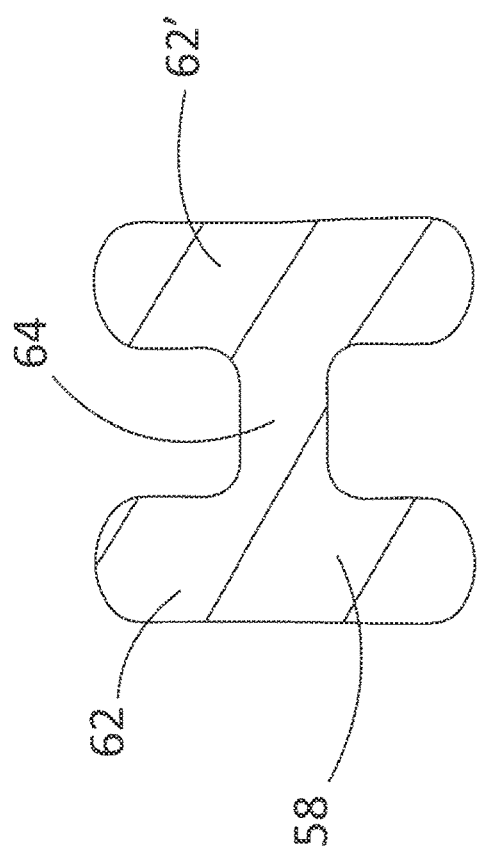
FIG. 6 is a sectional view of a spoke of the embodiment of the reinforced composite hybrid wheel of FIG. 5 taken along line 6-6 of FIG. 5 illustrating the I-beam configuration of the spoke.

The shape of the spoke may be modified from the H-beam configuration of FIGS. 3 and 4 to an alternative configuration while still achieving the desired lateral stiffness. Such an alternate configuration is illustrated in FIGS. 5 and 6. Referring to FIG. 5, a front view of an additional embodiment of the reinforced composite hybrid wheel of the disclosed inventive concept is illustrated and is generally shown as 50. The reinforced composite hybrid wheel 50 includes a composite rim 52 composed of a composite material that preferably includes a reinforcing carbon fiber. The composite rim 52 is attached to a cast or forged wheel center section 54 that is preferably aluminum although other materials could be used in the construction of the center section 54 as is known in the art.

Formed in the cast or forged wheel center section 54 is a plurality of lug holes 56 which may have the same pattern as illustrated or which may have an alternative pattern. Extending outward from the center section 54 is a plurality of spokes 58. A greater or lesser number of spokes 58 may be provided depending on wheel application and design preference.

A spoke-to-rim attachment 60 is provided between each spoke 58 and the composite rim 52. The spoke-to-rim attachment 60 may be any of several designs that incorporate mechanical fasteners, an adhesive or both. The spokes 58 of the reinforced composite hybrid wheel 50 have an I-beam configuration to maximize lateral stiffness. This construction is illustrated in FIG. 6 in which a sectional view of the spoke 58 of the reinforced composite hybrid wheel 50 is illustrated. As shown in that figure, the I-beam configuration is formed by a pair of opposed ribs 62 and 62' that are connected by a connecting rib 64. One or more additional ribs may be provided. In addition, one or more holes or hollow sections may be formed in one of the spokes 58 to reduce weight, add distinctive styling or both.

As a further general variation to the reinforced composite hybrid wheel of the disclosed inventive concept, one or more interchangeable inserts or rings may be attached to the face of the wheel, thereby providing for an enhanced appearance, improved structural integrity, and wheel protection. These embodiments are illustrated in FIGS. 7 through 11.

Referring to FIG. 7, a front view of an embodiment of the reinforced composite hybrid wheel of the disclosed inventive concept having interchangeable inserts is illustrated. The reinforced composite hybrid wheel, generally illustrated as 70, includes a composite rim 72 composed of a composite material that preferably includes a reinforcing carbon fiber. The composite rim 72 is attached to a cast or forged wheel center section 74 that is preferably aluminum although other materials could be used in the construction of the center section 74 as is known in the art.

Formed in the cast or forged wheel center section 74 is a plurality of lug holes 76 which may have the same pattern as illustrated or which may have an alternative pattern. Extending outward from the center section 74 is a plurality of spokes 78. A greater or lesser number of spokes 78 may be provided depending on wheel application and design preference.

Attached to one or more of the spokes 78 is an elongated insert 80 formed from a reinforced polymerized material, such as a long carbon fiber reinforced composite that is designed both for strength and abrasion-resistance. The number, placement, shape and size of the inserts 80 may be other than as illustrated. The number, placement, shape and size of each of the elongated inserts 80 may be determined based upon not only aesthetic appeal but also to add strength to the wheel.

A beneficial feature of the elongated inserts 80 and their use with the reinforced composite hybrid wheel 70 is their interchangeability. In the event that one or more inserts 80 become damaged, the owner can readily remove and replace the damaged insert. Ease of interchangeability also allows the consumer to readily modify the wheel to change the wheel's appearance as desired. As noted, use of the inserts 80 also reduces manufacturing costs by allowing a single, base wheel to be formed that is modifiable for specific applications merely by attachment of different inserts.

Referring to FIG. 8, a sectional view of the spoke 78 having an insert 80 attached thereto is illustrated. The insert 80 is preferably releasably attached to the spoke 78 by any of several methods, such as by mechanical fastening using a screw or a stud 82 and a nut fastener 84 as illustrated. As a possible alternative or supplement to mechanical fastening, the insert 80 may be attached to the spoke 78 by hook and loop fastening technology (not illustrated).

FIG. 9 illustrates the reinforced composite hybrid wheel 70 in perspective view with the inserts 80 being spaced apart from the cast or forged wheel center section 74. Stud-passing holes are selectively formed in each spoke 78 to allow the passing of the studs 82. A greater or lesser number of studs 82 may be provided as needed to best secure the insert 80 to the spoke 78.

As an alternative or in addition to the elongated insert of FIGS. 7 through 9, a faux bead composite lock ring may be attached to the rim of the reinforced composite hybrid wheel. Such an arrangement is illustrated in FIG. 10 in which a further alternative embodiment of the reinforced composite hybrid wheel of the disclosed inventive concept is illustrated. The reinforced composite hybrid wheel, generally illustrated as 90, includes a composite rim 92 composed of a composite material that preferably includes a reinforcing carbon fiber. The composite rim 92 is attached to a cast or forged wheel center section 94 that is preferably aluminum although other materials could be used in the construction of the center section 94 as is known in the art.

Formed in the cast or forged wheel center section 94 is a plurality of lug holes 96 which may have the same pattern as illustrated or which may have an alternative pattern. Extending outward from the center section 94 is a plurality of spokes 98. A greater or lesser number of spokes 98 may be provided depending on wheel application and design preference.

Attached to the spokes 98 is a faux bead composite lock ring 100. The faux bead composite lock ring 100 is attached in such a way so as to provide protection to the underlying composite rim 92. Attachment of the faux bead composite lock ring 100 to the spokes 98 is illustrated in FIG. 11. With reference thereto, a perspective view of the reinforced composite hybrid wheel 90 illustrating the faux bead composite lock ring 100 spaced apart from the cast or forged wheel center section 94 is shown. A stud-passing hole is selectively formed in each spoke 98 to allow the passing of studs 102 that extend from the underside of the faux bead composite lock ring 100. A greater or lesser number of studs 102 may be provided as needed to best secure the faux bead composite lock ring 100 the spokes 98. Nut fasteners 104 are used on the opposite side of the wheel 90 for releasably securing the faux bead composite lock ring 100 to the wheel 90. As a possible alternative or supplement to mechanical fastening, the faux bead composite lock ring 100 may be attached to the spokes 98 by screws or by hook and loop fastening technology (not illustrated).

A beneficial feature of the faux bead composite lock ring 100 is its ability to protect the underlying composite rim 92. The faux bead composite lock ring 100 is also easily interchanged so that in the event that the ring 100 is damaged, the owner can readily remove and replace the damaged ring. Ease of interchangeability of the ring 100 also allows the consumer to readily modify the wheel to change the wheel's appearance as desired. As noted, and like the inserts 80, the faux bead composite lock ring 100 also reduces manufacturing costs by allowing a single, base wheel to be formed that is modifiable for specific applications merely by attachment of different ring styles.

One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle wheel comprising:
    a metal, one piece center section formed from casting or forging, said center section including a center and a plurality of radially-extending spokes extending outward from said center, a recess formed in at least one of said spokes, said recess having opposed parallel walls;
    a strengthening attachment feature fixed to one or more of said spokes, said feature being formed from long carbon fiber reinforced composite material, said feature being formed separate from said center section, said strengthening attachment feature including a base for insertion into said recess, said base of said strengthening attachment feature being releasably attached to said spoke by one or more mechanical fasteners; and
    a composite tire-holding rim section attached to said spokes.

2. The vehicle wheel of claim 1, wherein said strengthening attachment feature is selected from the group consisting of an elongated insert and a ring.

3. The vehicle wheel of claim 1, wherein at least one of said spokes has an airfoil shape in cross-section.

4. The vehicle wheel of claim 3, wherein at least one of said spokes having an airfoil shape in cross-section includes a wing-like extension attached thereto.

5. The vehicle wheel of claim 1, wherein at least one of said spokes has a cross-section shape selected from the group consisting of an I-beam configuration and an H-beam in cross-section.

6. The vehicle wheel of claim 1, wherein at least one of said spokes has a hollow area formed therein.

7. The vehicle wheel of claim 1, wherein said attachment feature at least partially covers said composite tire-holding rim section.

8. A vehicle wheel comprising:
    a metal, one piece center section, said center section including a center and a plurality of radially-extending spokes extending outward from said center, at least one of said spokes having a smooth outer surface;
    a strengthening attachment feature fixed to said smooth outer surface of at least one of said spokes, said feature being formed from long carbon fiber reinforced composite material, said feature being selected from the group consisting of an elongated insert and a ring, said strengthening attachment feature being releasably attached to said spoke by one or more mechanical fasteners; and a
    composite tire-holding rim section attached to said spokes.

9. The vehicle wheel of claim 8, wherein said strengthening attachment feature is formed separate from said center section.

10. The vehicle wheel of claim 8, wherein said attachment feature defines a wing shape and extends at an angle from said spoke.

11. The vehicle wheel of claim 8, wherein at least one of said spokes has an airfoil shape in cross-section.

12. The vehicle wheel of claim 11, wherein at least one of said spokes having an airfoil shape in cross-section includes a wing-like extension attached thereto.

13. The vehicle wheel of claim 8, wherein at least one of said spokes has a cross-section shape selected from the group consisting of an I-beam configuration and an H-beam in cross-section.

14. The vehicle wheel of claim 8, wherein at least one of said spokes has a hollow area formed therein.

15. The vehicle wheel of claim 8, wherein said attachment feature at least partially covers said composite tire-holding rim section.

16. A vehicle wheel comprising:
    a metal, one piece center section formed from casting or forging, said center section including a center and a plurality of radially-extending spokes extending outward from said center, at least one of said spokes having a smooth outer surface or a recess;
    a strengthening feature selected from the group consisting of a carbon-fiber reinforced attachment feature attached to one or more of said spokes and a spoke having an H-beam construction or an I-beam construction, said strengthening feature being attached to said smooth outer surface or said recess of said spoke by an adhesive; and
    a composite tire-holding rim section attached to said spokes.

17. The vehicle wheel of claim 16, wherein said feature is formed separate from said center section.

18. The vehicle wheel of claim 16, wherein at least one of said spokes has an airfoil shape in cross-section and includes a wing-like extension attached thereto.

19. The vehicle wheel of claim 16, wherein at least one of said spokes has a hollow area formed therein.

* * * * *